Patented Nov. 5, 1940

2,220,441

UNITED STATES PATENT OFFICE 2,220,441

SYNTHETIC RESINOUS COMPOSITION

Paul Esselmann, Wolfen, Kreis Bitterfeld, and Josef Düsing, Dessau, Germany, assignors, by mesne assignments, to Walther H. Duisberg, New York, N. Y.

No Drawing. Application August 4, 1938, Serial No. 223,013. In Germany October 15, 1937

4 Claims. (Cl. 260—6)

This invention relates to the production of synthetic resinous compositions which are stable against acid and alkalies and which have a distinct basic character.

It is an object of the invention to provide certain novel synthetic resinous compositions of high practical value.

A further object of the invention is the provision of a process of producing the said compositions.

A still further object resides in the provision of shaped articles, such as fibres, films, ribbons and the like consisting of or comprising the new resinous compositions.

Additional objects will become apparent from the detailed specification following hereinafter.

We have found that exceedingly valuable compositions may be obtained by reacting a protein substance with an organic base and polymerizing the reaction product together with an aromatic isocyanate or isothiocyanate.

The reaction of the protein with the organic base may be brought about by adding the protein, which may be for instance casein, albumen or the like, to an aqueous solution of the organic base. If aromatic isocyanates are gradually added to this solution precipitation of a joint polymerization product occurs which is generally white or whitish-yellow in color.

It is sometimes of advantage to heat the mixture of protein, organic base and arylisocyanate after the addition of the latter for some hours in order to complete the polymerization.

Purification of the resins obtained can be effected by boiling with water, dilute acids or dilute caustics and washing with water.

Organic bases which are especially suitable for the purpose of the present invention are, for instance, the alkyleneimines, such as ethylene-, propylene- and butylene-imines, N-propylethyleneimine and N-benzylethyleneimine.

Furthermore, aliphatic amines may be used, such as for instance methylamine and its higher homologues, then aliphatic amines with a long carbon chain, such as for instance stearyl-amine, oleyl-amine and the like. The latter products are preferred, since they are easier to handle than the ordinary aliphatic amines. Aromatic amines can likewise be employed and very valuable products have been obtained from aniline and proteins by polymerizing with isocyanates.

The following examples serve to illustrate the invention:

*Example 1.*—To 10 liters of an aqueous solution of 15 per cent strength of ethyleneimine there are added gradually in small doses and while stirring 500 grams of casein. This mixture is allowed to stand 24 hours. The casein which has entered into reaction with the ethyleneimine is by this time completely dissolved. To this solution there are added drop by drop while cooling and vigorously stirring 3 kilos of phenyl-isocyanate. The white emulsion thus produced gradually solidifies to form a fine powder. It is insoluble in dilute acids and alkalies. The product contains 22 per cent of nitrogen.

*Example 2.*—300 grams of casein are added in doses while stirring to 1 liter of ethyleneimine solution of 30 per cent strength. The solution is allowed to stand overnight and then there are added drop by drop 300 cc. of phenyl-isocyanate. When the addition is complete, the whole is heated for 2 hours at 70° C., whereby a white to yellowish solid product is obtained.

*Example 3.*—500 grams of casein are stirred into 3.3 liters of ethyleneimine solution of 15 per cent strength. After a short heating at 40° C. the whole is allowed to stand for 24 hours at room temperature. The casein will then be completely dissolved. To this solution of casein-ethyleneimine there is added gradually by drops and while stirring 1 liter of phenyl-isocyanate, care being taken that the temperature does not rise above 40° C. The white product thus obtained is carefully filtered with suction and washed with hot water. This polymerization product is insoluble in dilute acid and alkali, but is soluble in pyridine, aniline and meta-toluidine, among other solvents.

*Example 4.*—300 cc. of a solution of 15 per cent strength of albumen which contains 15 per cent of ethyleneimine is caused to react in the manner described in Example 3 with 120 cc. of phenyl-isocyanate. The white brittle product thus obtained is insoluble in dilute acids and alkalies. It is soluble in pyridine, aniline, polyglycol and ethyl-polyglycol ether, among other solvents.

*Example 5.*—100 grams of casein are stirred with 660 cc. of a solution of pyridine of 10 per cent strength on the water bath until a homogeneous solution is obtained. This latter is filtered and there are added to it while stirring in drops 200 grams of phenyl-isocyanate. The white cheesy mass obtained is insoluble in dilute acids and alkalies.

*Example 6.*—200 grams of casein are dissolved in 1 liter of ammonia solution of 15 per cent strength. While stirring there are added to this solution in drops 400 grams of phenyl-isocyanate. When the reaction is complete, the whole is heated for 3 hours at 70° C. The whitish-yellow product thus obtained is extracted first with boiling dilute caustic soda lye and then with boiling water.

*Example 7.*—In 2½ liters of a solution of 15 per cent strength of ethyleneimine and 500 cc. of polyethyleneimine of 30 per cent strength which has been polymerized by means of carbon dioxide there are added while stirring in small portions 500 grams of albumen. After heating the mixture on the water-bath for a short time the whole is allowed to stand for 24 hours. To the filtered solution there are added while slowly stirring and in drops 1 liter of phenyl-isocyanate, care being taken that the temperature does not rise above 40° C. The cheesy white product is repeatedly extracted with boiling water. It is soluble in pyridine and aniline among other solvents.

*Example 8.*—A mixture of 60 grams of gelatin and 200 grams of aniline is heated for 10 hours on the steam-bath. The mixture is cooled down to 40° C. and 100 cc. of benzylisocyanate are gradually added in drops. The temperature rises up to 70° C. After the addition of the isocyanate the whole is left standing for 48 hours and then concentrated by evaporation. The yellow to brown polymerization product is filtered off, repeatedly washed with hot water. The whitish-yellow product thus obtained is soluble in pyridine.

*Example 9.*—100 grams of casein are dissolved in 1 liter of an aqueous solution of methylamine of 10 per cent strength. 180 grams of phenylisocyanate are added drop by drop to this solution while the latter is well stirred and the mixture is heated after the end of the reaction for another three hours to 60 to 70° C. The product obtained is yellowish-white in color and is washed with water and dilute caustic soda lye. It is insoluble in dilute acids and alkalies.

*Example 10.*—250 grams of stearylamine are dissolved in 250 cc. of alcohol and 250 cc. of benzene. 60 grams of powderized casein are added to the mixture and the latter is heated on the steam-bath for 14 hours under a reflux. After cooling down to 35° C. 100 cc. of phenylisocyanate are added in drops while stirring. The temperature of polymerization is allowed to rise to 70° C. After the reaction has come to an end the mixture is allowed to cool and left standing for two days. It is then again heated on the steam-bath, whereat a viscous solution is obtained. This solution is concentrated by evaporating and a white powdery substance is obtained which by melting yields a resinous condensation product of chocolate color with a melting point of 96° C. The nitrogen-containing polymerization product has a strongly hydrophobic character and is soluble in hot pyridine. The nitrogen-content is about 7.6 per cent.

What we claim is:

1. The process of producing synthetic resinous compositions, which comprises reacting a protein with an alkyleneimine, and jointly polymerizing the reaction product with a compound selected from the group consisting of aromatic isocyanates and aromatic isothiocyanates.

2. The process of producing a synthetic resinous composition, which comprises reacting ethyleneimine with a protein, and polymerizing the reaction product together with phenylisocyanate.

3. A synthetic resinous composition stable against alkalies and acids comprising the product of the joint polymerization of the reaction product of an alkyleneimine and a protein, and a compound selected from the group consisting of aromatic isocyanates and aromatic isothiocyanates.

4. A synthetic resinous composition stable against alkalies and acids, comprising the product of the joint polymerization of a reaction product of ethyleneimine and casein, and phenylisocyanate.

PAUL ESSELMANN.
JOSEF DÜSING.